(12) United States Patent
Kutsuna et al.

(10) Patent No.: US 8,389,082 B2
(45) Date of Patent: Mar. 5, 2013

(54) FUEL SYSTEM HAVING EXCELLENT GASOLINE BARRIER PROPERTY

(75) Inventors: Takaaki Kutsuna, Kanagawa (JP); Takeshi Koyama, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 2211 days.

(21) Appl. No.: 10/602,637

(22) Filed: Jun. 25, 2003

(65) Prior Publication Data

US 2003/0235668 A1  Dec. 25, 2003

(30) Foreign Application Priority Data

Jun. 25, 2002 (JP) ................................ 2002-185147
Jun. 25, 2002 (JP) ................................ 2002-185148

(51) Int. Cl.
*B32B 23/00* (2006.01)
*B32B 1/08* (2006.01)
(52) U.S. Cl. .................. 428/35.7; 428/34.1; 428/34.2; 428/35.9; 428/36.9
(58) Field of Classification Search .............. 428/34.1, 428/35.7, 35.9, 36.9, 36.91, 34.2
See application file for complete search history.

(56) References Cited

U.S. PATENT DOCUMENTS

| | | | |
|---|---|---|---|
| 3,553,283 A | | 1/1971 | Doss |
| 3,683,044 A | * | 8/1972 | Huang et al. ................ 525/526 |
| 3,704,229 A | * | 11/1972 | Tashiro et al. ............ 252/182.18 |
| 4,541,958 A | * | 9/1985 | Miyamoto et al. ............ 564/157 |
| 4,719,135 A | * | 1/1988 | Gerdes et al. ............. 428/35.7 |
| 5,458,258 A | | 10/1995 | White et al. |
| 5,474,853 A | * | 12/1995 | Watanabe et al. ............ 428/458 |
| 5,637,365 A | * | 6/1997 | Carlblom ................ 428/35.4 |

FOREIGN PATENT DOCUMENTS

| | | |
|---|---|---|
| EP | 0 742 267 A2 | 11/1996 |
| EP | 0 742 267 A3 | 11/1996 |
| EP | 1 350 822 A1 | 10/2003 |
| WO | WO 96/18669 | 6/1996 |
| WO | WO 99/12820 | 3/1999 |

OTHER PUBLICATIONS

European Search Report, mailed Nov. 14, 2003, for EP03011197.
European Patent Office Action, for Application No. 03 011 197.5-2115, dated Aug. 16, 2005.

* cited by examiner

*Primary Examiner* — Marc Patterson
(74) *Attorney, Agent, or Firm* — Antonelli, Terry, Stout & Kraus, LLP.

(57) ABSTRACT

Provided is a fuel system comprising a fuel vessel, molded parts for the fuel vessel and/or a tube for a fuel in which bodies are constituted from a thermoplastic resin and/or a rubber, wherein a coating layer is formed on the surfaces in at least one sides of the insides and the outsides of the fuel vessel body, the molded part bodies for the fuel vessel and/or the tube body for a fuel or at least one of connected parts with these bodies; the above coating layer is formed by curing an epoxy resin composition comprising an epoxy resin and an epoxy resin curing agent as principal components; and the above coating layer has a gasoline permeability coefficient of 2 g·mm/m²·day or less at 23° C. and a relative humidity of 60% RH. The above coating layer is excellent in a permeation-preventing performance against an automobile fuel (gasoline barrier property), a heat resistance and an impact resistance, then a fuel vessel, molded parts for the fuel vessel and a tube which have excellent performances are obtained.

19 Claims, No Drawings

FUEL SYSTEM HAVING EXCELLENT GASOLINE BARRIER PROPERTY

BACKGROUND OF THE INVENTION

1. Field of the Invention

The present invention relates to a fuel system comprising a fuel vessel, molded parts for the fuel vessel and a tube for a fuel which are excellent in a permeation-preventing performance against an automobile fuel (gasoline barrier property), a heat resistance and an impact resistance.

2. Description of the Related Art

In recent years, practical use turned from a metal-made fuel vessel to a thermoplastic resin-made fuel vessel has positively been promoted in a fuel vessel represented by a fuel vessel for automobiles from the viewpoints of a reduction in weight, a rust preventive property, easiness in mold processing and recycling property. When a fuel vessel is loaded in automobiles, various performances such as a heat resistance, a water resistance and an impact resistance are required to the vessel, and therefore a polyethylene-single layer type tank is spread as a thermoplastic resin-made fuel tank. However, there has been involved the problem that it has a relatively high gasoline permeability, so that a gasoline component is permeated and volatilized through a fuel vessel body. Accordingly, a multilayer tank comprising polyethylene and an ethylene-vinyl alcohol copolymer (EVOH) is proposed as a vessel having an excellent gasoline barrier property (Japanese Patent Application Laid-Open No. 29904/1997), and this has made it possible to obtain a fuel vessel having a better gasoline barrier property.

However, a gasoline barrier property of the fuel vessel is not necessary satisfactory to further strengthened environmental regulation, and therefore the performance is required to be raised further more.

In general, high density polyethylene is used for producing molded parts attached to a fuel vessel (for example, a fuel tube, a degassing line in an oil filler port, a valve for removing pressure and connectors thereof to a vessel body). This allows a fuel to be permeated and volatilized through these molded parts. Accordingly, even if a fuel vessel body is provided with an excellent gasoline barrier property, there has been brought about the problem that fuel is permeated and volatilized through molded parts connected thereto, and an amount thereof can not be neglected.

It is considered to use a barrier resin in place of high density polyethylene (for example, EVOH and the like) as means for solving the above problem. When using only a barrier resin for molded parts for a fuel vessel, the problem that gasoline is permeated and volatilized can be solved, but the heat fusing property thereof to a fuel vessel body, the mechanical strength and the impact resistance become unsatisfactory. Further, molded parts of a multilayer structure comprising high density polyethylene and a barrier resin are proposed (Japanese Patent Application Laid-Open No. 52658/2002). However, all connected parts produced by heat fusion and fitting are not of a structure in which they are substantially covered with a barrier resin, and the problem that gasoline is permeated and volatilized through the above parts has not yet been solved.

Further, in recent years, fuel tubes or hoses used mainly for vehicles have had to be elevated in a fuel permeation resistance as environmental regulation is strengthened. Tubes comprising conventional rubber materials as a principal component have come to be unable to meet these requirements, and therefore in order to meet them, tubes obtained by laminating a resin layer having a low permeability against a fuel such as gasoline in the inside of tubes comprising rubber materials have been put to actual use. Known are, for example, a tube in which a tube comprising polyamide base resin is inserted into the inside of a tube comprising a rubber material to form a double layer structure, a tube in which a tube-like rubber material is vulcanizably adhered with a fluorine rubber or a fluororesin layer to form a laminated structure (Japanese Patent Application Laid-Open No. 205745/2001), a tube in which a fluorine base resin powder or a resin powder obtained by blending it with a polyamide base resin is electrostatically coated on the inner face of a tube comprising a rubber material and heated to form a resin layer (Japanese Patent Application Laid-Open No. 25578/1996) and a tube in which a solution of a fluororesin or a polyamide resin is coated on the inner face of a tube comprising a rubber material to form a resin layer (Japanese Patent Application Laid-Open No. 165360/2001).

However, in the tube having a structure in which a tube of a different layer is inserted (Japanese Patent Application Laid-Open No. 205745/2001), it is difficult to make the wall thin, and the flexibility is reduced, so that application thereof to a tube having a complicated form is difficult. In the method in which a base resin powder is electrostatically coated (Japanese Patent Application Laid-Open No. 25578/1996), it is not easy to form a homogeneous resin layer having a prescribed thickness on the inner surface of a rubber hose, and there is the problem that pinholes are produced. Further, when using fluororesins in any tubes, it is difficult to obtain the good adhesiveness with base materials for a tube such as rubber materials, and it is required to carry out separately surface treatment or use an adhesive in combination. When using a polyamide resin (Japanese Patent Application Laid-Open No. 165360/2001), the good adhesiveness with base materials for a tube such as rubber materials is obtained, but the fuel permeation resistance thereof is not satisfactory, and the performance is required to be further elevated.

SUMMARY OF THE INVENTION

An object of the present invention is to solve the problems described above and provide a fuel system comprising a fuel vessel body which has a good gasoline barrier property and which is excellent in a heat resistance, an impact resistance and a profitability, molded parts for a fuel vessel in which improved to a large extent is leakage of a fuel from the connected pats of the fuel vessel body with a tube for a fuel, a degassing line in an oil filler port and a valve for removing pressure and which are excellent in a gasoline barrier property, a heat fusing property and a mechanical strength and a tube for a fuel which is prepared by evenly forming a resin layer on the surface of a tube in tight contact therewith and which is excellent in a high barrier property against fuel permeation, a flexibility, a bending resistance and a heat resistance.

Intensive investigations repeated by the present inventors in order to solve the problems described above have resulted in finding that a fuel system which is excellent in a gasoline barrier property, a heat resistance, an impact resistance and a profitability is obtained by forming a high gasoline-barrier coating layer comprising a specific epoxy resin and a specific epoxy resin curing agent as principal components on the surfaces of a fuel vessel, molded parts for the fuel vessel and tubes for a fuel in which bodies are constituted from a thermoplastic resin or rubber and the connected parts thereof.

That is, the present invention provides a fuel system comprising a fuel vessel, molded parts for the fuel vessel and/or a tube for a fuel in which bodies are constituted from a thermoplastic resin and/or a rubber, wherein a coating layer is formed on the surfaces in at least one sides of the insides and the outsides of the fuel vessel body, the molded part bodies for the fuel vessel and/or the tube body for a fuel or at least one of connected parts with these bodies; the above coating layer is formed by curing an epoxy resin composition comprising an epoxy resin and an epoxy resin curing agent as principal components; and the above coating layer has a gasoline permeability coefficient of 2 g·mm/m²·day or less at 23° C. and a relative humidity of 60% RH.

DESCRIPTION OF THE PREFERRED EMBODIMENTS

In the present invention, the fuel system comprises the fuel vessel, the molded parts for the fuel vessel or the tubes for a fuel or a combination thereof.

In this case, the fuel vessel means fuel vessels mounted on automobiles, auto-bikes, ships, aircrafts, generators and industrial and agricultural equipments or potable vessels for supplying these fuel vessels with fuels and vessels for storing fuels used for operating them. The molded parts for the fuel vessel are molded parts which are installed in the fuel vessel body and used, and to be specific, they include connectors for the fuel vessel, a cap for the fuel vessel and valves for the fuel vessel. Further, the tubes for a fuel are tubes used for the fuel vessel and the molded parts for the fuel vessel, and to be specific, they include tubes for transporting a fuel. The tubes for a fuel according to the present invention can be used as well for tubes other than those for transporting a fuel.

The fuel includes gasoline and gasoline obtained by blending methanol, ethanol or MTBE, that is, oxygen-containing gasoline as the representative examples thereof, and in addition thereto, heavy oil, gas oil and kerosene are given as the examples thereof.

Fuel Vessel Body:

First, the fuel vessel body shall be explained. The fuel vessel body constituting the fuel vessel in the present invention is usually made of a thermoplastic resin.

Any resins can be used for the thermoplastic resin constituting this fuel vessel body as long as the form can be maintained after molding, and they include, for example, polyolefin base resins such as polyethylene and polypropylene, polyester base resins such as polyethylene terephthalate, polyamide base resins such as nylon 6 and nylon 66, polyacryl base resins, polystyrene base resins, EVOH base resins, polyvinyl alcohol base resins, polycarbonate base resins and polyvinyl chloride base resins. However, they shall not be restricted to these resins. Among them, the polyolefin base resins are preferred, and among the polyolefin base resins, more preferred are polyethylene resins such as low density polyethylene, high density polyethylene and linear low density polyethylene. Among the polyethylene resins, the high density polyethylene resins are particularly preferred. Further, in order to elevate various performances such as the heat resistance and the impact resistance, these resins may be blended, if necessary, and used or the vessel body may be provided with a multilayer structure.

Further, scrapped resins produced in molding may be reused as the thermoplastic resin constituting the fuel vessel body. To be specific, they include loss parts produced in molding and crushed matters of products recovered after used by ordinary consumers. The waste amount is controlled by using such scrapped resins, and therefore it is preferred from the viewpoint of environmental protection and provides an effect of a reduction in the cost.

The thermoplastic resin forming this vessel body can be blended, if necessary, with various additives. Examples of being used as such additives are antioxidants such as 2,5-di-tert-butyl-hydroquinone and 2,6-di-tert-butyl-p-cresol, plasticizers such as phthalic acid esters, waxes, liquid paraffins and phosphoric acid esters, UV absorbers such as ethylene-2-cyano-3,3'-diphenyl acrylate and 2-(2'-hydroxy-5'-methylphenyl)benzo-triazole, antistatic agents such as pentaerythrite monostearate, sorbitan monopalmitate, sulfated polyolefins, polyethylene oxide and carbon wax, lubricants such as ethylenebisstearoamide and butyl stearate, colorants such as carbon black, phthalocyanine, quinacridone, indoline and azo base pigments and in addition thereto, fillers and heat stabilizers.

A method for obtaining the vessel body formed from the thermoplastic resin shall not specifically be restricted and includes molding methods carried out in the general fields of polyolefins, for example, extrusion molding, blow molding and injection molding, and extrusion molding and injection molding are particularly suited. Further, in order to elevate an adhesive property of the vessel body with the coating layer, if necessary, the internal and external surfaces of the vessel body may be subjected to various surface treatments such as corona discharge treatment and ozone treatment, an anchor coating material may be coated on the face of the vessel body on which the coating layer is formed, or a layer comprising an adhesive resin may be laminated on the face of the vessel body on which the coating layer is formed. An anchor coating material can suitably be selected from conventionally known materials such as organic titanium base materials, polyurethane base materials, polyethyleneimine base materials and polybutadiene base materials. However, they shall not be restricted to these materials. The anchor coating layer has a thickness of about 0.01 to 5.0 μm, particularly preferably about 0.05 to 2.0 μm. A method for coating the anchor coating material can suitably be selected from optional methods such as roll coating, coating with ironing, brush coating, flow coating, dipping and spray coating according to the form of the bodies which are coated. Further, it is possible to control the coating amount, homogenize the appearance and uniformize the layer thickness by an air knife method and a roll drawing method after these treatments. After coating the anchor coating material, the curing reaction of the anchor coating layer may be completed, if necessary, by means of a heating equipment. A method for heating the fuel vessel by means of a heating equipment can suitably be selected from conventionally known methods such as a dryer, high frequency induction heating, far infrared radiation heating and gas heating. An adhesive polyolefin resin can preferably be used as the adhesive resin, and to be specific, capable of being used are resins prepared by modifying polyolefin resins such as low density polyethylene, intermediate density polyethylene, high density polyethylene, linear low density polyethylene and polypropylene with unsaturated carboxylic acids such as maleic acid, acrylic acid and methacrylic acid or acid anhydrides thereof and resins obtained by diluting the modified matters thereof with polyolefin resins. The adhesive resin layer has a thickness of about 0.1 to 2.0 mm, particularly preferably about 0.5 to 1.0 mm.

The fuel vessel body has a whole thickness of preferably 300 to 10000 μm, more preferably 500 to 8500 μm and particularly preferably 1000 to 7000 μm. These thicknesses mean average thicknesses in the barrel part of the fuel vessel. The too large whole thickness makes the weight too large and exerts an adverse effect on the fuel consumption of automobiles, and the fuel vessel is increased in a cost. On the other hand, the too small whole thickness makes it impossible to maintain the rigidity and brings about the problem that the vessel is broken. Accordingly, it is important to set up the thickness corresponding to the capacity and the uses.

Molded Part Bodies for Fuel Vessel:

The molded parts for the fuel vessel include, to be specific, connectors for the fuel vessel, a cap for the fuel vessel and valves for the fuel vessel, but they shall not be restricted thereto. They are preferably the connectors for the fuel vessel and the valves for the fuel vessel.

The same thermoplastic resin as used for the fuel vessel body is used as well for the above molded part bodies, and it is possible to blend them with various additives, subject them to various treatments such as corona discharge treatment and ozone treatment, coat the anchor coating material described above on the face of the molded part bodies for fuel vessel on which the coating layer is formed, and use an adhesive resin described above in combination, in order to elevate the adhesive property thereof with the coating layer.

Tube Body for Fuel:

Any resins can be used for the thermoplastic resin constituting the tube body for a fuel according to the present invention as long as the form can be maintained after molding, and they include, for example, polyolefin resins such as polyethylene and polypropylene, polyurethane resins, polyester base resins such as polyethylene terephthalate; polyamide base resins such as nylon 6, nylon 66 and nylon 12, acryl resins; polystyrene base resins, ethylene-vinyl alcohol copolymer (EVOH) base resins, polyvinyl alcohol base resins, polycarbonate base resins and polyvinyl chloride base resins. In particular, preferred are resins having flexibility such as polyvinyl chloride resins and polyvinyl acetate resins.

The tube body for a fuel according to the present invention is constituted in a certain case from rubber having a flexibility such as natural rubber, polyisoprene rubber, polybutadiene rubber, epichlorohydrin rubber and copolymers thereof with acrylonitrile and styrene.

Further, a tube comprising a resin of a multilayer structure having a barrier resin layer for an intermediate layer can be used as well, if necessary. In the case of the tube comprising a resin of a multilayer structure having a barrier resin layer for an intermediate layer, an ethylene-vinyl alcohol copolymer (EVOH) resin is suitably used for the barrier resin layer, and EVOH having an ethylene content of 5 to 60 mole % and a saponification degree of 90% or more is preferred.

In respect to the thermoplastic resin and the rubber forming the tube body, several kinds of the thermoplastic resins and the rubbers may be blended, if necessary, and used in order to raise various performances such as the heat resistance and the flexibility.

Further, the thermoplastic resin and the rubber forming the tube body can be blended, if necessary, with the same various additives, process oils and processing aids as used for the fuel vessel and the other molded parts as long as the functions and the effects of the present invention are not damaged.

The tube shall not specifically be restricted in a form thereof and can have various forms such as a form in which parts excluding both ends are bellows-like, a cylindrical form and a goose neck form. The diameter and the thickness thereof can suitably be set up according to the uses. For example, when it is used as a fuel hose for automobiles, it has preferably a diameter of about 20 to 40 mm and a thickness of about 3 to 5 mm. The too large whole thickness makes the weight too large and exerts an adverse effect on the fuel consumption of automobiles, and the tube is increased in a cost. On the other hand, the too small whole thickness makes it impossible to maintain the shape and brings about the problem that the tube is readily broken. Further, in order to elevate an adhesive property thereof with the coating layer, if necessary, the internal and external surfaces of the tube may be subjected to various surface treatments such as corona discharge treatment and ozone treatment, the anchor coating material described above may be coated on the face of the tube body for fuel on which the coating layer is formed, or the tube body may be provided with a multilayer structure in combination with the adhesive resin described above.

Coating Layer:

Next, the coating layer formed on the surfaces in at least one sides of the bodies in the fuel system of the present invention shall be explained. The coating layer in the present invention is formed from an epoxy resin composition comprising an epoxy resin and an epoxy resin curing agent as principal components and characterized by having a gasoline permeability coefficient of 2 g·mm/m²·day or less, preferably 0.2 g·mm/m²·day or less and particularly preferably 0.02 g·mm/m²·day or less at 23° C. and a relative humidity of 60% RH.

In this case, the gasoline permeability coefficient is a value showing an amount of gasoline permeating through a sample having a thickness of 1 mm per square meter in 24 hours. Pseudo gasoline prepared by blending octane, toluene and ethanol at a volume ratio of 45/45/10 is used for determining this gasoline permeability coefficient.

A skeletal structure represented by Formula (1) which is contained in the coating layer formed by curing the epoxy resin composition described above accounts preferably for 30% by weight or more. The good gasoline barrier property is revealed by controlling the above skeletal structure to 30% by weight or more.

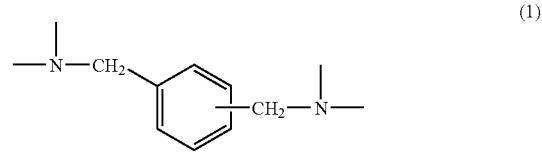

The epoxy resin and the epoxy resin curing agent in the epoxy resin composition used for the coating layer shall be explained below in details.

Epoxy Resin:

The epoxy resin used for the coating layer in the present invention may be any one of saturated and unsaturated aliphatic compounds and alicyclic compounds, aromatic compounds and heterocyclic compounds, and epoxy resins containing an aromatic ring in a molecule are preferred considering that the high gasoline barrier property is revealed.

To be specific, examples of being used are epoxy resins having a glycidylamine part derived from metaxylylenediamine, epoxy resins having a glycidyl-amine part derived from 1,3-bis(aminomethyl)cyclo-hexane, epoxy resins having a glycidylamine part and/or a glycidyl ether part derived from paraamino-phenol, epoxy resins having a glycidyl ether part derived from bisphenol A, epoxy resins having a glycidyl ether part derived from bisphenol F, epoxy resins having a glycidyl ether part derived from phenol novolak and epoxy resins having a glycidyl ether part derived from resorcinol. Among them, preferred are the epoxy resins having a glycidylamine part derived from metaxylylenediamine, the epoxy resins having a glycidylamine part derived from 1,3-bis(aminomethyl)cyclohexane, the epoxy resins having a glycidyl ether part derived from bisphenol F and the epoxy resins having a glycidyl ether part derived from resorcinol.

In the epoxy resin used in the present invention, more preferably used as the principal component are the epoxy resins having a glycidyl ether part derived from bisphenol F and the epoxy resins having a glycidylamine part derived from metaxylylenediamine, and the epoxy resins having a glycidylamine part derived from metaxylylenediamine are particularly preferably used as the principal component.

Further, a variety of the epoxy resins described above can be blended in a suitable proportion and used for the epoxy resin in the present invention in order to raise various performances such as the flexibility, the impact resistance and the moisture and heat resistance.

The epoxy resins described above can be obtained by reacting various alcohols, phenols and amines with epichlorohydrin. For example, the epoxy resins having a glycidylamine part derived from metaxylylenediamine are obtained by adding epichlorohydrin to metaxylylenediamine.

In this case, the glycidylamine part described above includes mono-, di-, tri- and/or tetra-glycidylamine parts which can be substituted with four hydrogen atoms in diamines in xylylenediamine. The respective proportions of the mono-, di-, tri- and/or tetra-glycidylamine parts can be changed by changing a reaction proportion of metaxylylenediamine to epichlorohydrin. For example, an epoxy resin having primarily a tetraglycidylamine part can be obtained by subjecting metaxylylenediamine to addition reaction with about four moles of epichlorohydrin.

The epoxy resins described above can be synthesized by reacting various alcohols, phenols and amines with an excess amount of epihalorohydrin on a temperature condition of 20 to 140° C., preferably 50 to 120° C. in the case of the alcohols and the phenols and 20 to 70° C. in the case of the amines in the presence of an alkali such as sodium hydroxide to separate the resulting alkali halides.

A number average molecular weight of the resulting epoxy resins is different depending on a mole ratio of epihalorohydrin to various alcohols, phenols and amines, and it is about 80 to 4000, preferably about 200 to 1000 and more preferably about 200 to 500.

Epoxy Resin Curing Agent:

Epoxy resin curing agents which can usually be used such as polyamines, phenols, acid anhydrides and carboxylic acids can be used for the epoxy resin curing agent used for the coating layer in the present invention. These epoxy resin curing agents may be any one of saturated and unsaturated aliphatic compounds and alicyclic compounds, aromatic compounds and heterocyclic compounds.

To be specific, examples of being used as the polyamines are aliphatic amines such as ethylene-diamine, diethylenetriamine, triethylenetetraamine and tetraethylenepentaamine; aliphatic amines having an aromatic ring such as metaxylylenediamine and paraxylylenediamine and alicyclic amines such as 1,3-bis(aminomethyl)cyclohexane, isophoronediamine and norbornanediamine; aromatic amines such as diamino-diphenylmethane and metaphenylenediamine; and reaction products of these products used as raw materials with epoxy resins or monoglycidyl compounds, reaction products thereof with alkylene oxides having 2 to 4 carbon atoms, reaction products thereof with epichlorohydrin and reaction products thereof with multifunctional compounds having at least one acyl group which can form amide group parts by reacting with these polyamines to form oligomers, and reaction products of multifunctional compounds having at least one acyl group which can form amide group parts by reacting with these polyamines to form oligomers with monovalent carboxylic acids having 1 to 8 carbon atoms and/or the derivatives thereof.

The phenols include multisubstituent monomers such as catechol, resorcinol and hydroquinone and resol type phenol resins.

Examples of the acid anhydrides or the carboxylic acids include such as dodecenylsuccinic anhydride and polyadipic anhydride, alicyclic acid anhydrides such as (methyl)tetrahydrophthalic anhydride and (methyl)hexahydrophthalic anhydride and aromatic acid anhydrides such as phthalic anhydride, trimellitic anhydride and pyromellitic anhydride and carboxylic acids corresponding to them.

Considering the high gasoline barrier property, a good adhesiveness of the coating layer to various materials, a flexibility and a heat resistance, the reaction product of (A) and (B) or the reaction product of (A), (B) and (C) each described below is preferably used as the epoxy resin curing agent:

(A) metaxylylenediamine or paraxylylenediamine (they are referred to as polyamines), (B) a multifunctional compound having at least one acyl group which can form an amide group part by reacting with the polyamine described above to form an oligomer, (C) monovalent carboxylic acid having 1 to 8 carbon atoms and/or the derivative thereof.

The multifunctional compound of (B) described above having at least one acyl group which can form an amide group part by reacting with the polyamine described above to form an oligomer includes carboxylic acids such as acrylic acid, methacrylic acid, maleic acid, fumaric acid, succinic acid, malic acid, tartaric acid, adipic acid, isophthalic acid, terephthalic acid, pyromellitic acid and trimellitic acid and the derivatives thereof, for example, esters, amides, acid anhydrides and acid chlorides. In particular, acrylic acid, methacrylic acid and the derivatives thereof are preferred.

The monovalent carboxylic acid of (C) having 1 to 8 carbon atoms includes formic acid, acetic acid, propionic acid, butyric acid, lactic acid, glycolic acid and benzoic acid. Further, the derivatives thereof, for example, esters, amides, acid anhydrides and acid chlorides can be used as well. They may be reacted with polyamines (metaxylylenediamine or paraxylylenediamine) using in combination with the multifunctional compounds described above.

A reaction mole ratio of (A) to (B) or (A) to (B) and (C) each described above falls preferably in a range of 0.3 to 0.97 in terms of a ratio of the number of the amino groups contained in (A) to the number of the reactive functional groups contained in (B) or a ratio of the number of the amino groups contained in (A) to the total number of the reactive functional groups contained in (B) and (C). If the ratio is smaller than 0.3, a satisfactory amount of the amide groups is not produced in the epoxy resin curing agent, and the gasoline barrier property of a high level and the adhesive property to various materials are not revealed. On the other hand, if the ratio is higher than 0.97, an amount of the amino groups reacted with the epoxy resin is decreased, and the excellent impact resistance and heat resistance are not revealed. Further, considering that the higher adhesive property to various materials is revealed, the amide groups of at least 6% by weight based on the whole weight of the above curing agent are preferably contained in the epoxy resin curing agent. The amide group part introduced by reaction has a high cohesive force, and the presence of the amide group part in the epoxy resin curing agent in a high proportion reveals the higher gasoline barrier property and markedly improves a gasoline leakage preventing performance of the coating layer. In addition, it provides the good adhesive strength to various materials. Further, a variety of the epoxy resin curing agents described above can be blended in a suitable proportion and used in order to raise various performances such as the flexibility, the impact resistance and the moisture and heat resistance.

Epoxy Resin Composition:

A blending proportion of the epoxy resin curing agent to the epoxy resin which is a principal component for the epoxy resin composition may fall in a standard blending range used when an epoxy resin composition is usually prepared by reacting an epoxy resin with an epoxy resin curing agent in the case of the fuel vessel and the molded parts. To be specific, a ratio of the number of active hydrogens contained in the epoxy resin curing agent to the number of epoxy groups contained in the epoxy resin falls in a range of 0.5 to 5.0, preferably 0.8 to 2.0. In the case of the tube, a ratio of the number of active hydrogens contained in the epoxy resin curing agent to the number of epoxy groups contained in the epoxy resin falls preferably in a range of 0.8 to 3.0, but considering a flexibility and a bending resistance of the resulting cured matter, it falls more preferably in a range of 1.2 to 3.0, particularly preferably 1.4 to 3.0. If it falls in a range of less than 0.8, the remaining unreacted epoxy groups cause a reduction in a gasoline barrier property of the resulting cured matter, and if it falls in a range of more than 3.0, the remaining unreacted amino groups cause a reduction in a moisture and heat resistance and an acid resistance of the resulting cured matter.

Further, a polyurethane base resin composition, a polyacryl base resin composition and a polyurea base resin composition may be mixed, if necessary, with the epoxy resin composition in the present invention as long as the effects of the present invention are not damaged.

When the coating layer is formed on the surface of the fuel system, a wetting agent such as silicon or acryl compounds may be added to the epoxy resin composition described above in order to aid wetting on the surface. The suitable wetting agent includes BYK331, BYK333, BYK348 and BYK381 which are available from Bic Chemie Co., Ltd. When adding them, they account preferably for a range of 0.01 to 2.0% by weight based on the whole weight of the cured reaction product.

In order to raise various performances such as a gasoline barrier property, an impact resistance and a heat resistance of the coating layer formed in the present invention, an inorganic filler such as silica, alumina, mica, talc, aluminum flake and glass flake may be added to the epoxy resin composition. Considering the high gasoline barrier property, such inorganic fillers are preferably tabular. When adding them, they account preferably for a range of 0.01 to 10.0% by weight based on the whole weight of the cured reaction product.

Further, a coupling agent such as a silane coupling agent and a titanium coupling agent may be added to the epoxy resin composition in order to elevate an adhesive property of the coating layer formed in the present invention. When adding them, they account preferably for a range of 0.01 to 5.0% by weight based on the whole weight of the cured reaction product.

Further, the epoxy resin composition forming the coating layer formed in the present invention may be added, if necessary, required amounts of respective components including a curing-accelerating catalyst such as N-ethylmorpholine, dibutyltin dilaurate, cobalt naphthenoate and stannous chloride, an organic solvent such as benzyl alcohol, a rust preventive additive such as zinc phosphate, iron phosphate, calcium molybdate, vanadium oxide, water-dispersed silica and fumed silica, an organic pigment such as a phthalocyanine base organic pigment and a condensed polycyclic organic pigment and an inorganic pigment such as titanium oxide, zinc oxide, calcium carbonate, barium sulfate, alumina and carbon black.

Formation of Coating Layer:

In the present invention, the coating layer has practically a thickness of about 1 to 200 μm, preferably 5 to 100 μm. If it is less than 1 μm, the satisfactory gasoline barrier property is not revealed, and if it exceeds 200 μm, it is difficult to control the film thickness thereof.

When the coating layer is formed on the surface of the fuel vessel body, the coating layer can be formed on any surface of the inside and the outside of the fuel vessel body. Considering to reveal the substantial gasoline barrier property, the coating layer is formed at an area rate falling in a range of preferably 50 to 100%, more preferably 75 to 100% and particularly preferably 80 to 100% of a surface area of the vessel.

When the coating layer is formed on the surfaces of the molded part bodies for the fuel vessel, the coating layer is formed on the portions where a fuel is likely to be volatilized or scattered according to the form and the material of the parts used, whereby gasoline is substantially inhibited from volatilizing or scattering. More preferably, the coating layer is formed on the surfaces of all the molded parts for the fuel vessel.

When the coating layer is formed on the surface of the tube body, the coating layer is formed on the portions where a fuel is likely to be volatilized or scattered according to the form and the material of the tube body used, whereby gasoline is substantially inhibited from volatilizing or scattering. More preferably, the coating layer is formed on the whole surface of at least one face of the outer surface and the inner surface of the tube body.

When the epoxy resin composition is coated on the surfaces of the fuel vessel body, the molded part bodies for the fuel vessel and the tube body for a fuel or the surfaces of the connected parts of these bodies, a concentration of the epoxy resin composition can have various situations extending from the case where a solvent is not used to the case where some kind of a suitable organic solvent and/or water are used to dilute the composition to a concentration of about 5% by weight according to the kind and a mole ratio of the materials selected and the coating method. The suitable organic solvent includes non-water soluble solvents such as toluene, xylene and ethyl acetate, glycol ethers such as 2-methoxyethanol, 2-ethoxyethanol, 2-propoxyethanol, 2-butoxyethanol, 1-methoxy-2-propanol, 1-ethoxy-2-propanol and 1-propoxy-2-propanol, alcohols such as methanol, ethanol, 1-propanol, 2-propanol, 1-butanol and 2-butanol and aprotic polar solvents such as N,N-dimethylformamide, N,N-dimethylacetamide, dimethyl-sulfoxide and N-methylpyrrolidone. Preferred are the solvents having a relatively low boiling point such as methanol, ethyl acetate and 2-propanol. When using the solvent, the solvent drying temperature after coating may be various temperatures extending from room temperature to about 140° C.

The coating layer is formed by curing the epoxy resin composition, and a method for coating the epoxy resin composition on the surfaces of the fuel vessel body and the molded part bodies for the fuel vessel, the connected parts of the molded part bodies with the fuel vessel body and the surface of the tube body can suitably be selected from optional methods such as roll coating, coating with ironing, brush coating, flow coating, dipping and spray coating according to the form of the bodies which are coated. Further, it is possible to control the coating amount, homogenize the appearance and uniformize the layer thickness by an air knife method and a roll drawing method after these treatments.

After coating the epoxy resin composition, the curing reaction of the coating layer may be completed, if necessary, by means of a heating equipment. A method for heating the fuel vessel by means of a heating equipment can suitably be selected from conventionally known methods such as a dryer, high frequency induction heating, far infrared radiation heating and gas heating. The heating treatment is preferably carried out at a reached material temperature falling in a range of 50 to 300° C., preferably 70 to 200° C.

Connection of Vessel and Parts:

In the fuel system of the present invention, the coating layer is formed on surfaces in at least one side of the insides and the outsides of the fuel vessel body, the molded part bodies for the fuel vessel and/or the tube body for a fuel and the connected parts of the bodies, and therefore the coating layer is advisably formed on at least a part of the surface of the fuel system body. The fuel system includes, for example, the fuel vessel having the above coating layer formed on the surface thereof which is installed (connected) with the molded part bodies having no above coating layer formed on the surface thereof and the fuel vessel having no above coating layer formed on the surface thereof which is installed (connected) with the molded part bodies having the above coating layer formed on the surface thereof.

A method for installing the fuel vessel body with the molded parts and the tube shall not specifically be restricted and includes installation by screwing and inserting and installation by heat fusion, and installation by heat fusing is preferred. Conventional methods are used for heat fusion and include a method in which the fusing faces of the fuel vessel body, the molded parts and the tube are heated by means of a heater and then they are fused, a method in which the fuel vessel body, the molded parts and the tube are subjected to high frequency fusion and a method in which the fuel vessel body, the molded parts and the tube are subjected to supersonic fusion. However, they shall not be restricted thereto.

The use embodiments of the molded parts as molded part connecters include an embodiment in which they are used as connectors for a fuel vessel installed to the fuel vessel body and an embodiment in which a flexible pipe, tube or hose for transporting a fuel is installed, but they shall not be restricted thereto. Connections by screwing, inserting and heat fusion are given as the examples of a method for installing the fuel vessel body with these connectors, and they are preferably installed by heat fusion. The connectors are suitably excellent in a stress crack resistance characteristic and an organic solvent resistance from the viewpoint of a long range continuous usability of the molded parts for the fuel vessel, that is, a product life thereof.

The cap for a fuel is used as a closing tool for an oil feeding port. A fitting method thereof shall not specifically be restricted and includes a screwing system and an inserting system. A large part of caps for a fuel is made of metal at present, but attentions are paid on a cap made of a thermoplastic resin from the viewpoint of a reduction in weight and recycling. A cap for a fuel which is made of a thermoplastic resin is preferably excellent in a gasoline barrier property, an organic solvent resistance and a stress crack resistance characteristic. It is repeatedly opened and closed, and therefore it is further preferably excellent as well in a mechanical strength such as an abrasion resistance.

When the coating layer is formed on the connected parts of the molded parts for the fuel vessel with the fuel vessel body, the coating layer is formed on the portions where a fuel is likely to be volatilized or scattered according to the form and the material of the parts used and a method for connecting with the fuel vessel body, whereby gasoline is substantially inhibited from volatilizing or scattering. More preferably, the coating layer is formed on all the connected parts of the molded parts for the fuel vessel with the fuel vessel body.

In the fuel vessel according to the present invention, the coating layer having an excellent gasoline barrier property is formed on the surface of the thermoplastic resin-made vessel by curing the epoxy resin composition. This makes it possible to provide the fuel vessel having, in addition to a gasoline barrier property, a heat resistance, a toughness and an impact resistance which are performances essentially endowed to an epoxy resin.

Further, in the molded parts for the fuel vessel according to the present invention, the coating layer having an excellent gasoline barrier property is formed on the surfaces of the above parts or the connected parts of the parts with the fuel vessel body by curing the epoxy resin composition. This inhibits volatilizing and scattering of gasoline from the molded parts for the fuel vessel and volatilizing and scattering of gasoline from the connected parts of the parts with the fuel vessel body which have been conventional problems, and the fuel vessel having an excellent gasoline barrier property is provided.

Further, the tube for a fuel according to the present invention is characterized by that the coating layer comprising the epoxy resin composition is formed thereon, and it is excellent in an adhesiveness to the thermoplastic resin such as a vinyl resin and a synthetic rubber which forms the tube body. It has an excellent flexibility as compared with those of conventional epoxy resins, and therefore when it is formed on a clamping part at both ends of the fuel hose, the clamping workability and the sealing property are not deteriorated. Further, it can be formed on the clamping part at both ends of the fuel hose, and therefore the coating layer can be formed by a simple step as is the case with a method in which a resin solution is filled in an inside and discharged, so that it can readily be prepared. Accordingly, the tube which is excellent in a fuel permeation resistance, a flexibility, a clamping workability and a sealing property is obtained.

The tube for a fuel according to the present invention can suitably be used, for example, as a hose for transporting a fuel. The fuel includes gasoline and gasoline obtained by blending methanol, ethanol or MTBE, that is, oxygen-containing gasoline as the representative examples thereof, and in addition thereto, heavy oil, gas oil and kerosene are given as the examples thereof. Further, the tube for a fuel according to the present invention is excellent in a gas barrier property to various gases such as oxygen, nitrogen and carbon dioxide in addition to a fuel such as gasoline, and it can suitably be used to uses requiring the gas barrier property described above.

EXAMPLES

The examples of the present invention shall be introduced below, but the present invention shall by no means be restricted by these examples.

First, the epoxy resin curing agents were produced by the following methods and used in the examples and the comparative examples.

<Epoxy Resin Curing Agent A>

A reaction vessel was charged with 1 mole of metaxylilenediamine. The temperature was elevated up to 60° C. under nitrogen flow, and 0.67 mole of methyl acrylate was dropwise added in one hour. After finishing dropwise adding, the solution was stirred at 120° C. for one hour, and the temperature was further elevated up to 180° C. in 3 hours while distilling resulting methanol off. The solution was cooled down to 100° C., and a prescribed amount of methanol was added thereto so that the solid matter concentration was controlled to 70% by weight to obtain an epoxy resin curing agent A.

<Epoxy Resin Curing Agent B>

A reaction vessel was charged with 1 mole of metaxylilenediamine. The temperature was elevated up to 60° C. under nitrogen flow, and 0.90 mole of methyl acrylate was dropwise added in one hour. After finishing dropwise adding, the solution was stirred at 120° C. for one hour, and the temperature was further elevated up to 180° C. in 3 hours while distilling resulting methanol off. The solution was cooled down to 100° C., and a prescribed amount of methanol was added thereto so that the solid matter concentration was controlled to 70% by weight to obtain an epoxy resin curing agent B.

<Epoxy Resin Curing Agent C>

A reaction vessel was charged with 1 mole of metaxylilenediamine. The temperature was elevated up to 120° C. under nitrogen flow, and 0.93 mole of methyl acrylate was dropwise added in one hour. After finishing dropwise adding, the solution was stirred at 120° C. for one hour, and the temperature was further elevated up to 180° C. in 3 hours while distilling resulting methanol off. The solution was cooled down to 100° C., and a prescribed amount of methanol was added thereto so that the solid matter concentration was controlled to 70% by weight to obtain an epoxy resin curing agent C.

<Epoxy Resin Curing Agent D>

A reaction vessel was charged with 1 mole of metaxylilenediamine. The temperature was elevated up to 120° C. under nitrogen flow, and 0.33 mole of methyl acrylate was dropwise added in one hour, followed by stirring the solution at 120° C. for 0.5 hour. Further, 0.33 mole of malic acid was added thereto little by little, and the solution was stirred for 0.5 hour. The temperature was elevated up to 180° C. in 3 hours while distilling off resulting water and methanol. The solution was cooled down to 100° C., and a prescribed amount of methanol was added thereto so that the solid matter concentration was controlled to 70% by weight to obtain an epoxy resin curing agent D.

<Epoxy Resin Curing Agent E>

A reaction vessel was charged with 1 mole of metaxylilenediamine. The temperature was elevated up to 120° C. under nitrogen flow, and 0.67 mole of methyl acrylate was dropwise added in one hour, followed by stirring the solution at 120° C. for 0.5 hour. Further, 0.33 mole of acetic acid was added thereto in 0.5 hour, and the solution was stirred for one hour. The temperature was elevated up to 180° C. in 3 hours while distilling off resulting water and methanol. The solution was cooled down to 100° C., and a prescribed amount of methanol was added thereto so that the solid matter concentration was controlled to 70% by weight to obtain an epoxy resin curing agent E.

<Epoxy Resin Curing Agent F>

A reaction vessel was charged with 1 mole of metaxylilenediamine. The temperature was elevated up to 60° C. under nitrogen flow, and 0.50 mole of methyl acrylate was dropwise added in one hour. After finishing dropwise adding, the solution was stirred at 120° C. for one hour, and the temperature was further elevated up to 160° C. in 3 hours while distilling resulting methanol off. The solution was cooled down, whereby an epoxy resin curing agent F was obtained.

The gasoline barrier property was evaluated by the following method.

(1) Gasoline Permeability Coefficient of a Coating Layer in a Coat Film (Examples 1 to 3 and Comparative Example 1)

An aluminum-made cap of 75 mm $\phi$ was charged with pseudo gasoline (isooctane/toluene/ethanol=45/45/10) and covered with a test film for evaluation, and a contact point of the cap and the film was coated with an adhesive and tightly sealed. Measurement was carried out by a gas phase method in which the film was not brought into direct contact with gasoline. The cap was left standing still for 500 hours under the environment of 60° C. to determine the gasoline permeability (g/m$^2$·day) from a weight change. The gasoline permeability coefficient of the coating layer in the test film was calculated using the following equation:

$$1/R = 1/R_n \, (n=1, 2, ---) + DFT/P$$

wherein R is a gasoline permeability (g/m$^2$·day) of the test film; $R_n$ (n=1, 2, ---) is a gasoline permeability (g/m$^2$·day) of the respective base material films; DFT is a thickness (mm) of the coating layer; and P is a gasoline permeability coefficient (g·mm/m$^2$·day) of the coating layer.

(2) Gasoline Permeability of the Tube and Gasoline Permeability Coefficient of the Coating Layer in the Tube (Examples 4 to 8 and Comparative Examples 2 to 4)

One end face of a test piece (length: 500 mm, inner diameter: 24 mm and thickness: 5 mm) obtained from the tube prepared was sealed with an aluminum-deposited film. The tube was charged with about 30 g of pseudo gasoline (isooctane/toluene/ethanol=45/45/10), and the other end face was similarly sealed with an aluminum-deposited film. It was left standing still for 500 hours under the environment of 60° C. and 60% RH to determine the gasoline permeability (g/m$^2$·day) from a weight change.

The gasoline permeability coefficient of the coating layer was calculated using the following equation:

$$1/R = 1/R' + DFT/P$$

wherein R is a gasoline permeability (g/m$^2$·day) of the tube; R' is a gasoline permeability (g/m$^2$·day) of the tube body; DFT is a thickness (mm) of the coating layer; and P is a gasoline permeability coefficient (g·mm/m$^2$·day) of the coating layer.

(3) Gasoline Permeability of the Tube After Bending Treatment (10 Times) (Examples 4 to 8 and Comparative Examples 2 to 4)

A test piece (length: 500 mm, inner diameter: 24 mm and thickness: 5 mm) obtained from the tube prepared was subjected 10 times to bending treatment. After the treatment, the gasoline permeability coefficient (g·mm/m$^2$·day) was determined by the same method as the method for evaluating a gasoline permeability coefficient of the untreated product.

Example 1

Prepared was a methanol/ethyl acetate=1:1 solution (solid matter concentration: 30% by weight) containing 44 parts by weight of the epoxy resin curing agent A and 50 parts by weight of an epoxy resin having a glycidylamine part derived from metaxylylenediamine (TETRAD-X, manufactured by Mitsubishi Gas Chemical Co., Ltd.), and 0.02 part by weight of an acryl base wetting agent (BYK381, manufactured by Bic Chemie Co., Ltd.) and stirred well to obtain a coating liquid. This coating liquid was coated on high density polyethylene (HDPE) having a thickness of 100 μm by means of a bar coater No. 24 and dried at 120° C. for 10 minutes, and then it was further cured at 180° C. for 10 minutes, whereby a coated film was obtained. The coating layer had a thickness of 10 μm. A gasoline permeability coefficient of the coated film thus obtained was determined. The result thereof is shown in Table 1. The skeletal structure represented by Formula (1) contained in the above coating layer accounted for 54.1% by weight.

Example 2

A coated film was prepared and evaluated by the same methods as in Example 1, except that 72 parts by weight of the epoxy resin curing agent B was substituted for the epoxy resin curing agent A. The result thereof is shown in Table 1. The skeletal structure represented by Formula (1) contained in the coating layer accounted for 56.5% by weight.

Example 3

A coated film was prepared and evaluated by the same methods as in Example 1, except that 78 parts by weight of the epoxy resin curing agent C was substituted for the epoxy resin curing agent A. The result thereof is shown in Table 1. The skeletal structure represented by Formula (1) contained in the coating layer accounted for 56.9% by weight.

Comparative Example 1

A film of 100 μm comprising EVOH (ethylene content: 32 mole %, saponification: 99.6%) was evaluated for a gasoline permeability coefficient. The result thereof is shown in Table 1.

TABLE 1

| | Gasoline permeability coefficient (g · mm/m² · day) |
|---|---|
| Example 1 | 0.006 |
| Example 2 | 0.006 |
| Example 3 | 0.004 |
| Comparative Example 1 | 0.20 |

Example 4

An acrylonitrile-butadiene rubber was molded into a tube having an inner diameter of 24 mm and a thickness of 5 mm, and this was cut to a length of 500 mm to obtain a tube body. Prepared was a methanol/ethyl acetate 1:1 solution (solid matter concentration: 30% by weight) containing 50 parts by weight of the epoxy resin having a glycidylamine part derived from metaxylylenediamine (TETRAD-X, manufactured by Mitsubishi Gas Chemical Co., Ltd.) and 115 parts by weight of the epoxy resin curing agent A, and 0.02 part by weight of the acryl base wetting agent (BYK381, manufactured by Bic Chemie Co., Ltd.) and stirred well to obtain a resin solution. One end face of the tube body described above was sealed with an aluminum matter (aluminum-deposited film), and this resin solution was filled into the tube body and immediately discharged, whereby the resin solution was coated onto the inner face of the tube body. After discharging the resin solution, the aluminum matter was detached from the end face of the tube body, and the resin solution was cured at 80° C. for 10 minutes and then at 120° C. for 15 minutes to form a coating layer. The coating layer had a thickness of 10 μm. The tube in which the coating layer was formed was evaluated for a gasoline barrier property and a gasoline barrier property after bending (a gasoline permeability coefficient of the coating layer, a gasoline permeability of the tube and a gasoline permeability of the tube after the bending treatment (10 times)). The results thereof are shown in Table 2. The skeletal structure represented by Formula (1) contained in the above coating layer accounted for 61.4% by weight.

Example 5

A tube was prepared by the same method as in Example 4, except that 132 parts by weight of the epoxy resin curing agent B was substituted for the epoxy resin curing agent A, and the gasoline barrier property and the gasoline barrier property after bending were evaluated. The results thereof are shown in Table 2. The skeletal structure represented by Formula (1) contained in the above coating layer accounted for 59.3% by weight.

Example 6

A tube was prepared by the same method as in Example 4, except that 163 parts by weight of the epoxy resin curing agent C was substituted for the epoxy resin curing agent A, and the gasoline barrier property and the gasoline barrier property after bending were evaluated. The results thereof are shown in Table 2. The skeletal structure represented by Formula (1) contained in the above coating layer accounted for 60.5% by weight.

Example 7

A tube was prepared by the same method as in Example 4, except that 110 parts by weight of the epoxy resin curing agent D was substituted for the epoxy resin curing agent A, and the gasoline barrier property and the gasoline barrier property after bending were evaluated. The results thereof are shown in Table 2. The skeletal structure represented by Formula (1) contained in the above coating layer accounted for 66.5% by weight.

Example 8

A tube was prepared by the same method as in Example 4, except that 140 parts by weight of the epoxy resin curing agent E was substituted for the epoxy resin curing agent A, and the gasoline barrier property and the gasoline barrier property after bending were evaluated. The results thereof are shown in Table 2. The skeletal structure represented by Formula (1) contained in the above coating layer accounted for 59.4% by weight.

Comparative Example 2

A nylon-12 resin was used as a barrier resin layer, and an acrylonitrile-butadiene rubber was used as an external layer to mold them into a tube having an inner diameter of 24 mm, a thickness of 0.1 mm in the barrier resin layer and a thickness of 5 mm in the external layer by means of an injection molding machine. This tube was cut to a length of 500 mm, and the gasoline barrier property and the gasoline barrier property after bending were evaluated. The result thereof is shown in Table 2.

Comparative Example 3

A tube was prepared by the same method as in Comparative Example 2, except that a copolymer resin of vinylidene fluoride, propylene hexafluoride and ethylene tetrafluoride was used as the barrier resin layer, and the gasoline barrier property and the gasoline barrier property after bending were evaluated. The result thereof is shown in Table 2.

Comparative Example 4

A tube was prepared by the same method as in Example 4, except that 33 parts by weight of the epoxy resin curing agent F was substituted for the epoxy resin curing agent A, and the gasoline barrier property and the gasoline barrier property after bending were evaluated. The result thereof is shown in Table 2.

TABLE 2

| | Gasoline permeability coefficient of coating layer (g · mm/m² · day) | Gasoline permeability of tube (g/m² · day) | Gasoline permeability of tube after bending (g/m² · day) |
|---|---|---|---|
| Example 4 | 0.010 | 1.0 | 1.1 |
| Example 5 | 0.009 | 0.9 | 1.0 |
| Example 6 | 0.009 | 0.9 | 1.0 |
| Example 7 | 0.012 | 1.2 | 1.2 |
| Example 8 | 0.010 | 1.0 | 1.1 |
| Comparative Example 2 | — | 150 | 150 |
| Comparative Example 3 | — | 14 | 100 |
| Comparative Example 4 | 0.015 | 1.5 | 10 |

What is claimed is:

1. A fuel system comprising a fuel vessel, molded parts for the fuel vessel and/or a tube for a fuel in which bodies thereof are constituted from a thermoplastic resin and/or a rubber, wherein:
    a coating layer is formed on the surfaces in at least one sides of the insides and the outsides of the fuel vessel body, the molded part bodies for the fuel vessel and/or the tube body for a fuel or at least one of connected parts in these bodies;
    the above coating layer is formed by curing an epoxy resin composition comprising an epoxy resin and an epoxy resin curing agent as principal components;
    the above coating layer, which is barrier layer for gasoline, has a gasoline permeability coefficient of 2 g·mm/m²·day or less at 60° C. and a relative humidity of 60% RH;
    the epoxy resin described above comprises epoxy resin having a glycidylamine part derived from 1,3-bis(aminomethyl)-cyclohexane; and
    the epoxy resin curing agent comprises a reaction product of (A) and (B) or a reaction product of (A), (B) and (C):
    (A) metaxylylenediamine or paraxylylenediamine,
    (B) a multifunctional compound having at least one acyl group which can form an amide group part by reacting with polyamine to form an oligomer, the multifunctional compound being selected from the group consisting of acrylic acid, methacrylic acid, and derivatives of acrylic acid, methacrylic acid, maleic acid, fumaric acid, succinic acid, malic acid, tartaric acid, pyromellitic acid and trimellitic acid, and
    (C) monovalent carboxylic acid having 1 to 8 carbon atoms and/or a derivative thereof; and
    the coating layer contains skeletal structure represented by the following formula (1)

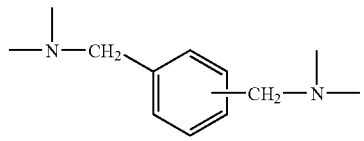

in an amount of 30% by weight or more based on the weight of the coating layer.

2. The fuel system as described in claim 1, wherein the gasoline permeability coefficient is 0.2 g·mm/m²·day or less.

3. The fuel system as described in claim 1, wherein the multifunctional compound (B) described above is acrylic acid, methacrylic acid and/or a derivative thereof.

4. The fuel system as described in claim 1, wherein the coating layer is formed on any surface of the inside and the outside of the fuel vessel body constituted from a thermoplastic resin at an area rate of 50 to 100%.

5. The fuel system as described in claim 4, wherein the thermoplastic resin constituting the fuel vessel body is a polyolefin resin.

6. The fuel system as described in claim 5, wherein the thermoplastic resin constituting the fuel vessel body is a polyethylene resin.

7. The fuel system as described in claim 1, wherein the coating layer is formed on at least one sides of the insides and the outsides of the molded part bodies for the fuel vessel constituted from a thermoplastic resin.

8. The fuel system as described in claim 7, wherein the thermoplastic resin constituting the molded part bodies for the fuel vessel is a polyolefin resin.

9. The fuel system as described in claim 8, wherein the thermoplastic resin constituting the molded part bodies for the fuel vessel is a high density polyethylene resin.

10. The fuel system as described in claim 1, wherein the tube comprises the tube body molded from a thermoplastic resin and/or a rubber and the coating layer formed on an external surface and/or an internal surface of the above tube.

11. The fuel system as described in claim 10, wherein the thermoplastic resin of the tube body is at least one selected from a polyolefin resin, a polyurethane resin, a polyamide resin, a polyester resin, an acryl resin and a vinyl resin which have flexibility.

12. The fuel system as described in claim 11, wherein a blending proportion of the epoxy resin curing agent to the epoxy resin contained in the epoxy resin composition in the coating resin layer of the tube body falls in a range of 1.2 to 3.0 in terms of an equivalent ratio (active hydrogen/epoxy group) of active hydrogen contained in the epoxy resin curing agent to an epoxy group contained in the epoxy resin.

13. The fuel system as described in claim 1, wherein the coating layer is formed on at least one of the connected parts of the body selected from the fuel vessel body, the molded part bodies for the fuel vessel and the tube body for a fuel.

14. The fuel system as described in claim 1, wherein a reaction mole ratio of (A) to (B), or (A) to (B) and (C), is within a range of 0.3 to 0.97 in terms of number of amino groups in (A) to the number of reactive functional groups in (B), or number of amino groups in (A) to total number of reactive functional groups in (B) and (C).

15. The fuel system as described in claim 1, wherein a blending proportion of the epoxy resin curing agent to the epoxy resin contained in the epoxy resin composition in the coating resin layer of the tube body falls in a range of 1.2 to 3.0 in terms of an equivalent ratio (active hydrogen/epoxy group) of active hydrogen contained in the epoxy resin curing agent to an epoxy group contained in the epoxy resin, and wherein a blending proportion of the epoxy resin curing agent to the epoxy resin contained in the epoxy resin composition in the coating resin layer of the fuel vessel of the molded part bodies falls in a range of 0.5 to 5.0 in terms of said equivalent ratio.

16. The fuel system as described in claim 1, wherein a thickness of said coating layer is in a range of 1 to 200 μm.

17. The fuel system as described in claim 1, wherein said multifunctional compound is selected from the group consisting of said derivatives.

18. The fuel system as described in claim 1, wherein said gasoline permeability coefficient of said coating layer is 0.02 g·mm/m$^2$·day or less.

19. The fuel system as described in claim 1, wherein a number average molecular weight of said epoxy resin is in a range of 80 to 4000.

* * * * *